(12) United States Patent
Tsubaki

(10) Patent No.: US 9,762,800 B2
(45) Date of Patent: Sep. 12, 2017

(54) IMAGE PROCESSING APPARATUS AND METHOD, AND IMAGE CAPTURING APPARATUS FOR PREDICTING MOTION OF CAMERA

(71) Applicant: CANON KABUSHIKI KAISHA, Tokyo (JP)

(72) Inventor: Hidetoshi Tsubaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 617 days.

(21) Appl. No.: 14/216,333

(22) Filed: Mar. 17, 2014

(65) Prior Publication Data

US 2014/0293004 A1 Oct. 2, 2014

(30) Foreign Application Priority Data

Mar. 26, 2013 (JP) ................................. 2013-064916

(51) Int. Cl.
*H04N 5/232* (2006.01)
*H04N 5/222* (2006.01)
(Continued)

(52) U.S. Cl.
CPC ......... *H04N 5/23254* (2013.01); *H04N 5/145* (2013.01); *H04N 5/2224* (2013.01);
(Continued)

(58) Field of Classification Search
CPC .......................... H04N 5/23248–5/2329; G03B 2205/0007–2205/0038; G03B 2217/005; G03B 2207/005; G02B 27/646
See application file for complete search history.

(56) References Cited

U.S. PATENT DOCUMENTS

2001/0022619 A1 9/2001 Nishiwaki
2005/0168581 A1* 8/2005 Shinohara .......... H04N 5/23203
348/208.1
(Continued)

FOREIGN PATENT DOCUMENTS

EP 1137270 A2 9/2001
JP 2007-215114 A 8/2007
(Continued)

OTHER PUBLICATIONS

European Search Report issued on Sep. 26, 2014, that issued in the corresponding European Patent Application No. 14161758.9.
(Continued)

*Primary Examiner* — Dennis Hogue
(74) *Attorney, Agent, or Firm* — Cowan, Liebowitz & Latman, P.C.

(57) ABSTRACT

An image processing apparatus comprises: an input unit configured to input an image signal obtained by photoelectrically converting, by an image sensor, an optical image incident via an optical system including optical image stabilization unit; an acquisition unit configured to acquire optical image stabilization control information obtained by the optical image stabilization unit; and a motion of camera prediction unit configured to predict a motion of camera based on information obtained by eliminating influence of optical image stabilization by the optical image stabilization unit from the image signal input from the input unit based on the optical image stabilization control information.

12 Claims, 7 Drawing Sheets

(51) Int. Cl.
*H04N 5/14* (2006.01)
*G06T 19/00* (2011.01)
*H04N 13/02* (2006.01)
*H04N 13/00* (2006.01)

(52) U.S. Cl.
CPC ..... *H04N 5/23267* (2013.01); *H04N 5/23287* (2013.01); *G06T 19/006* (2013.01); *H04N 5/23209* (2013.01); *H04N 5/23258* (2013.01); *H04N 13/0246* (2013.01); *H04N 2013/0081* (2013.01); *H04N 2201/3245* (2013.01)

(56) References Cited

U.S. PATENT DOCUMENTS

| | | | | |
|---|---|---|---|---|
| 2008/0246848 A1* | 10/2008 | Tsubaki | ............... | G06T 7/20 348/208.4 |
| 2009/0180770 A1 | 7/2009 | Honjo | | |
| 2011/0221657 A1* | 9/2011 | Haddick | ............... | G02B 27/017 345/8 |
| 2011/0317024 A1* | 12/2011 | Miyasako | ............... | H04N 5/23254 348/208.11 |

FOREIGN PATENT DOCUMENTS

| | | |
|---|---|---|
| JP | 2008-259076 A | 10/2008 |
| JP | 2009-159514 A | 7/2009 |
| JP | 4446041 B | 4/2010 |
| JP | 2011-097512 A | 5/2011 |

OTHER PUBLICATIONS

Sep. 7, 2015 Japanese Office Action, that issued in Japanese Patent Application No. 2013064916.
G. Klein, D. Murray, Parallel, "Tracking and Mapping on a Camera Phone," In Proc. ISMAR, 09, 2009.
R. Szeliski, "Compute Vision Algorithms and Applications," 2010.
C. Harris and M. Stephens, "A Combined Corner and Edge Detector," Fourth Alvey Vision Conference, pp. 147-151, 1988.
B. Triggs, "Autocalibration from Planar Scenes," ECCV98, 1998.
R. Hartley, A. Zisserman, "Multiple View Geometry in Computer Vision," Cambridge Univ. Press, 2000.
Bill Triggs, "Routines for Relative Pose of Two Calibrated Cameras from 5 Points," Documentation, INRIA, Jul. 23, 2000.
Michal Irani, et al., "Multi-Frame Correspondence Estimation Using Subspace Constraints," International Journal of Computer Vision 48, 1, pp. 39-51, Oct. 18, 2000.
Nov. 3, 2016 Chinese Office Action, that issued in Chinese Patent Application No. 201410116446.0.

* cited by examiner ($Shy_0, Shp_0$)

RENDERING VIEW IS OFFSET
BY AMOUNT OF TRANSLATION CAUSED
BY IMAGE STABILIZATION

CG CREATION

SPRITE SYNTHESIS ($Shy_n, Shp_n$)

RENDERING VIEW IS OFFSET
BY AMOUNT OF TRANSLATION CAUSED
BY IMAGE STABILIZATION

CG CREATION

SPRITE SYNTHESIS

TRANSLATION CAUSED
BY IMAGE STABILIZATION IS REMOVED

GEOMETRIC
TRANSFORMATION

TRANSLATION CAUSED BY IMAGE STABILIZATION IS RESTORED
(BY SUBTRACTING AMOUNT OF TRANSLATION CAUSED
BY GEOMETRIC TRANSFORMATION)

IMAGE PROCESSING APPARATUS AND METHOD, AND IMAGE CAPTURING APPARATUS FOR PREDICTING MOTION OF CAMERA

BACKGROUND OF THE INVENTION

Field of the Invention

The present invention relates to an image processing apparatus and method for predicting a camera work (motion of camera) from a moving image shot by an image capturing apparatus having an optical image stabilization function, and an image capturing apparatus.

Description of the Related Art

Recently, a technique of analyzing a camera work including changes in position and angle of a camera from a moving image and enhancing user friendliness by using this result is being widely applied. For example, an augmented reality (AR) technique of synthesizing a shot video and computer graphics (CG) is becoming popular, starting with a technique for smartphones. In particular, a markerless AR technique which implements CG synthesis by analyzing a camera work using natural features as input information has a wide application range and is very promising (see, for example, G. Klein, D. Murray, "Parallel Tracking and Mapping on a Camera Phone", In Proc. ISMAR '09). The analysis of camera work is positioned as a core technique for attractive applications and products such as moving image stabilization, three dimensional information acquisition, and a camera work measurement/recording apparatus serving as a motion sensor using vision (see, for example, Japanese Patent Laid-Open No. 2007-215114). In this manner, the spread of various applied techniques and products is expected.

When a video is shot by a handheld compact image capturing device such as a smartphone, the video blurs. Conventionally, the AR technique is a broadcasting technique used in a shooting studio or the like, and is often used in combination with a special stable image capturing jig such as a crane or steady cam, so a blur hardly stands out. If the compact image capturing device is combined with such a special jig to solve the problem of the blur, this impairs portability which is a merit of the compact image capturing device. It readily occurs to solve the problem of the blur by adopting an optical image stabilization mechanism in the image capturing apparatus. The use of the optical image stabilization mechanism has merits: a blur that occurs during charge accumulation can be suppressed to improve the image quality, search for corresponding points or motion vectors can be facilitated in image analysis, and the image stabilization margin can be saved in image stabilization (see, for example, Japanese Patent No. 4446041).

However, when the optical image stabilization mechanism is introduced to suppress a blur, a motion shift between a shot video and CG stands out and accurate camera trajectory information cannot be obtained under a given condition in, for example, the AR application. Examples of the given condition are as follows: shooting is performed with a wide-angle lens; the size of a synthesized object is large with respect to the shooting angle of view; three dimensional camera work prediction and synthesis are performed; the motion is large; the display screen is large and the resolution is high; and these conditions co-occur. In these cases, camera work information based on a higher-accuracy camera model is required for faithful reproduction of the reality.

In such a case, for example, in the AR application, the motions of a shot video and CG do not coincide with each other and look tilted. In the moving image stabilization application, a shake remains. In three dimensional information acquisition, an error is generated in acquired three dimensional information. For the original purpose of camera work prediction, no accurate camera trajectory information can be obtained.

In this case, a complicated camera model which considers even optical image stabilization and has many variables may be prepared to predict a camera work by using an optimization technique such as model fitting to image information or information extracted from an image. However, this measure increases the number of prediction variables and exponentially increases the calculation amount of optimization calculation, impairing calculation convergence and processing stability to be impractical.

SUMMARY OF THE INVENTION

The present invention has been made in consideration of the above situation, and acquires, based on an image obtained by an image capturing apparatus having an optical image stabilization function, a motion of camera from which the influence of the optical image stabilization function is eliminated.

According to the present invention, provided is an image processing apparatus comprising: an input unit configured to input an image signal obtained by photoelectrically converting, by an image sensor, an optical image incident via an optical system including optical image stabilization unit; an acquisition unit configured to acquire optical image stabilization control information obtained by the optical image stabilization unit; and a motion of camera prediction unit configured to predict a motion of camera based on information obtained by eliminating influence of optical image stabilization by the optical image stabilization unit from the image signal input from the input unit based on the optical image stabilization control information.

Further, according to the present invention, provided is an image capturing apparatus comprising: an image sensor; and the image processing apparatus defined as above.

Furthermore, according to the present invention, provided is an image processing method to be performed in an image processing apparatus comprising: an input step of inputting an image signal obtained by photoelectrically converting, by an image sensor, an optical image incident via an optical system including optical image stabilization unit; an acquisition step of acquiring optical image stabilization control information obtained by the optical image stabilization unit; and a motion of camera prediction step of predicting a motion of camera based on information obtained by eliminating influence of optical image stabilization by the optical image stabilization unit from the image signal input in the input step based on the optical image stabilization control information.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Exemplary embodiments of the present invention will be described in detail in accordance with the accompanying drawings.

First Embodiment

Figure 1:
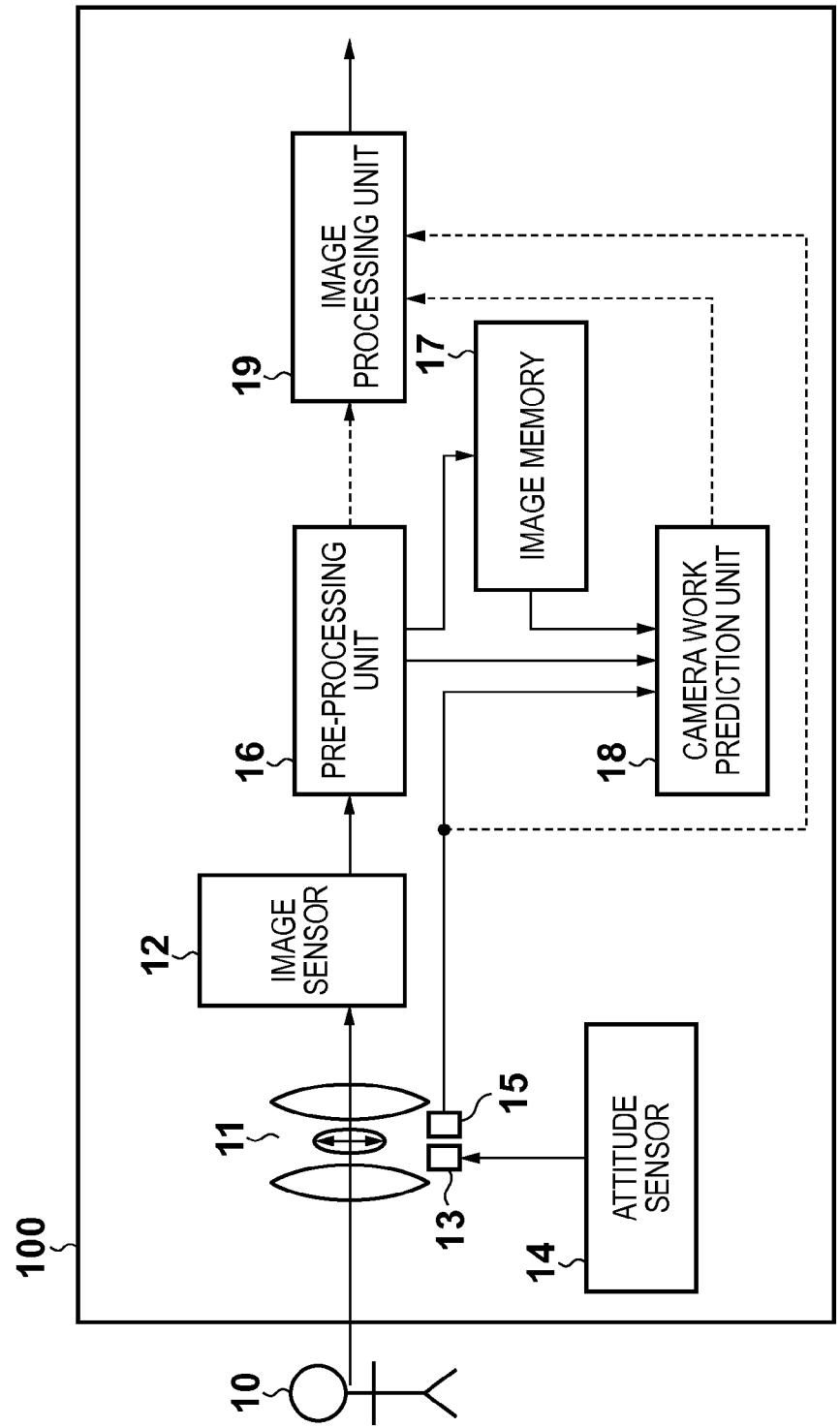
FIG. 1 is a block diagram showing the schematic arrangement of an image capturing apparatus in the first embodiment of the present invention.

FIG. 1 is a block diagram showing the arrangement of an image capturing apparatus in the first embodiment of the present invention. The image capturing apparatus according to the first embodiment is an image capturing apparatus capable of analyzing a camera work (motion of camera) from a shot video. The image capturing apparatus includes an optical image stabilization mechanism and camera work prediction unit. FIG. 1 is a block diagram showing the arrangement of the main part of the image capturing apparatus.

An image capturing apparatus 100 includes an optical system 11, image sensor 12, optical image stabilization control unit 13, attitude sensor 14, optical image stabilization control monitoring unit 15, pre-processing unit 16, image memory 17, camera work prediction unit 18, and image processing unit 19.

The optical system 11 is constructed by a plurality of lenses and mirrors, and forms light traveling from an object 10 into an image on the image sensor 12. The attitude sensor 14 is constructed by a gyrosensor or the like. The attitude sensor 14 measures information of an attitude change with respect to a limited arbitrary axis of the image capturing apparatus 100, and transmits the information to the optical image stabilization control unit 13. The optical image stabilization control unit 13 is constructed by a displacement element. The optical image stabilization control unit 13 translates the position of an optical image on the image sensor 12 by shifting some lenses of the optical system 11 in a direction perpendicular to the optical axis, based on an attitude change, that is, camera work of the image capturing apparatus 100. This suppresses a blur of the video caused by a shake of the image capturing apparatus 100. The optical image stabilization control monitoring unit 15 is constructed by an encoder or the like, and measures the shift amount of a lens which performs optical image stabilization.

The pre-processing unit 16 performs, for an analog image signal photoelectrically converted by the image sensor 12, basic processes such as noise removal by correlated double sampling (CDS), exposure control by gain-up in auto gain control (AGC), black level correction, and A/D conversion. Accordingly, an image signal converted into a digital signal is obtained. To improve the accuracy and robustness of camera work prediction processing from an image, including feature amount extraction and vector calculation, filtering processing such as low- or high-pass filtering, and tone adjustment processing such as tone mapping may be performed for an input image to the camera work prediction unit 18. In this manner, main processing is pre-processing for an analog signal, so the main part is also called an analog front end (AFE). A part paired and used with a digital output sensor is called a digital front end (DFE).

The image memory 17 is a memory which temporarily saves a pre-processed image signal generated by the pre-processing unit 16. The camera work prediction unit 18 predicts a camera work by using an image signal generated by the pre-processing unit 16 and a past image signal accumulated in the image memory 17.

The image processing unit 19 performs image processing for an input digital image signal, including Bayer array interpolation, linearization matrix processing, white balance adjustment, YCC conversion, color difference/tone/contrast correction, and edge enhancement. This image processing is generally called post-processing or development. By performing these processes, an output video of one frame or field can be generated. These processes are also called digital back end (DBE) processing with respect to AFE processing by the pre-processing unit 16.

Further, the image processing unit 19 includes, as an option, an AR synthesis function of rendering CG and synthesizing the rendered CG with a generated shot output video. The image processing unit 19 also includes, as options, an image stabilization function of suppressing a blur between the frames or fields of successively generated output images by geometric transformation processing, and a three dimensional information acquisition function of performing three dimensional image analysis processing between successively output images to predict three dimensional information or depth information corresponding to an image. CG creation, geometric transformation processing, three dimensional image analysis, and the like are executed using camera work information predicted by the camera work prediction unit 18, based on a general camera vector (CV) technique as described in, for example, R. Szeliski, "Compute Vision Algorithms and Applications", (2010).

Figure 2:
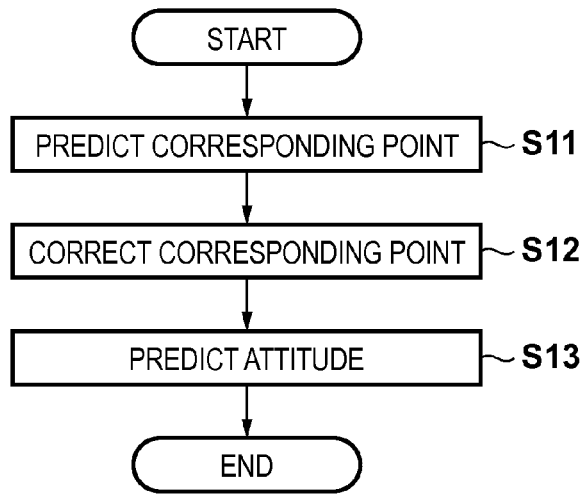
FIG. 2 is a flowchart showing camera work prediction processing according to the present invention.

FIG. 2 is a flowchart showing camera work prediction processing to be executed by the camera work prediction unit 18 in the image capturing apparatus having the above-described arrangement according to the first embodiment.

In step S11, motion information of a corresponding position, that is, a corresponding point between a frame directly input from the pre-processing unit 16 and one or a plurality of past frames input from the image memory 17 is predicted. The corresponding point can be obtained as follows: for points of interest arranged in a grid on one image, template matching or the gradient method is executed on the other image. A feature amount is extracted from one image, and template matching or the gradient method is executed on the other image by using the feature amount position as a template. Alternatively, feature amounts are extracted from respective images, and combinatorial search is performed between the feature amounts.

Figure 4:
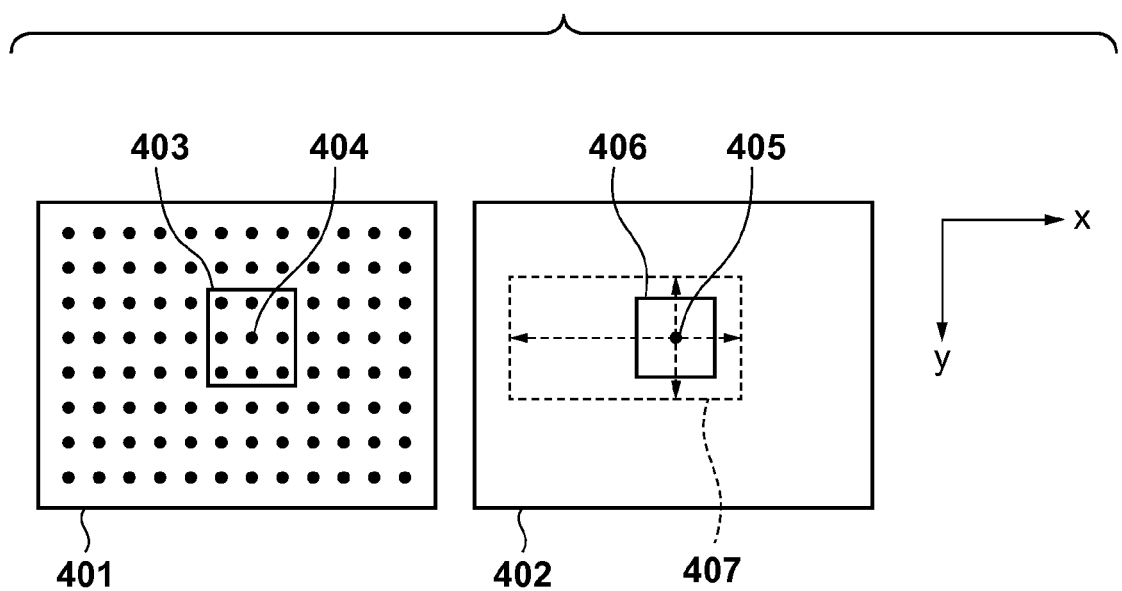
FIG. 4 is a view for explaining block matching.

A method of performing corresponding point prediction by block matching, which is a kind of template matching, will be explained with reference to FIG. 4. FIG. 4 shows an example of block matching. Here, a left image 401 serves as a reference image, and a right image 402 serves as a search image. For example, a corresponding point is detected using a previously input video frame as a reference image, and a subsequently input current video frame as a search image. A partial region of a predetermined size centered on each of points 404 of interest arranged in a grid on the reference image 401 is set as a template 403. An arbitrary search region 407 is set in the search image 402. While sequentially moving the template 403, a position where the template 403 matches best the arbitrary search region 407 is searched for. At this time, the similarity between a region 406 using a pixel 405 of interest as a reference in the search image 402 and the template 403 of the reference image 401 is calculated. As the similarity index, a calculation result by correlation calculation such as Sum of Square Difference (SSD), Sum of Absolute Difference (SAD), or normalized cross-correlation is used. When luminance fluctuation between frames is large, like a shot video, normalized cross-correlation is mainly used. Equation (1) is a similarity score calculation equation in normalized cross-correlation:

$$R(x, y, x', y') = \frac{\sum_{i=-M_T}^{M_T}\sum_{j=-N_T}^{N_T}\{I_{(x,y)}(i,j)-\bar{I}\}\{I'_{(x',y')}(i,j)-\bar{I}'\}}{\sqrt{\sum_{i=-M_T}^{M_T}\sum_{j=-N_T}^{N_T}\{I_{(x,y)}(i,j)-\bar{I}\}^2}\sqrt{\sum_{i=-M_T}^{M_T}\sum_{j=-N_T}^{N_T}\{I'_{(x',y')}(i,j)-\bar{I}'\}^2}} \quad (1)$$

where $$\bar{I} = \frac{1}{M_T N_T}\sum_{i=-M_T}^{M_T}\sum_{j=-N_T}^{N_T} I_{(x,y)}(i,j), \quad (2)$$

$$\bar{I}' = \frac{1}{M_T N_T}\sum_{i=-M_T}^{M_T}\sum_{j=-N_T}^{N_T} I'_{(x',y')}(i,j)$$

(x, y) and (x', y') are template positions in a reference image I and search image I', respectively, and $I_{(x, y)}(i, j)$ and $I'_{(x', y')}(i, j)$ are partial images.

After all similarities in the search region are calculated, a position having a highest similarity is regarded as a corresponding position, and a corresponding point is calculated. If there is no occlusion, corresponding points are calculated by the number of points 404 of interest set on the reference image 401. The corresponding point is represented by a vector whose start point is the position of a point of interest in a reference image and whose end point is the position of a corresponding point in a search image:

$$(x,y,x',y')^i, i=1,\ldots,m$$

(m: number of corresponding points)  (3)

Note that an example of block matching in which points of interest are permanently arranged in a grid has been described. Alternatively, feature amounts at which corresponding points are easily calculated may be extracted from a reference image, and their positions may be set as points of interest. Extraction of a point of interest generally uses an image processing filter such as a Harris operator (see, for example, C. Harris and M. Stephens, "A combined corner and edge detector", Fourth Alvey Vision Conference, pp. 147-151, 1988).

As for the Harris operator, first, a window size W is decided, and a differential image $(I_{dx}, I_{dy})$ in the horizontal and vertical directions is calculated. It suffices to use a Sobel filter or the like for calculation of the differential image. For example, as the filter, a 3×3 filter $h_x$ in which $$h=[1,\sqrt{2},1]/(2+\sqrt{2})$$

is set in the lateral direction and three of this are arrayed in the longitudinal direction, and a 3×3 filter $h_y$ in which this expression is set in the longitudinal direction and three of this are arrayed in the lateral direction are applied to an image, obtaining the differential image $(I_{dx}, I_{dy})$.

For all coordinate points (x, y) in the image, a matrix G is calculated using the window W:

$$G = \begin{bmatrix} \sum_W I_x^2 & \sum_W I_x I_x \\ \sum_W I_x I_x & \sum_W I_y^2 \end{bmatrix} \quad (4)$$

Feature amounts are extracted sequentially from a coordinate point (x, y) having a largest minimum singular point of the matrix G. At this time, it is preferable that feature amounts are not so dense. Thus, for example, a promise not to calculate any more feature amount in the periphery of the window size W around the coordinate point (x, y) at which a feature amount has already been extracted may be set.

Next, in step S12, corresponding point information is processed using optical image stabilization control information which is obtained by the optical image stabilization control unit 13 and represents the effect of the optical image stabilization mechanism. This cancels the optical image stabilization effect, that is, video translation performed to suppress a blur.

The optical image stabilization control information is a physical amount representing the amount of a coordinate change caused by video translation for the optical image stabilization effect. However, when the optical system 11 is a zoom lens and the focal length changes, the video translation amount changes even if a camera rotation amount supplied from the attitude sensor 14 remains unchanged. For easy control, the optical image stabilization control information may be handled as a set of a plurality of control physical amounts including the camera rotation amount, translation amount, and focal length. For example, one piece of optical image stabilization control information is defined as a value to be scaled so that multiplying this value by the focal length of the optical system yields the translation amount of an image on the sensor surface. That is, letting θ be the camera rotation, this value may be handled as an angle:

$$Sh = f\tan\theta \cong f\theta, \theta = \tan\left(\frac{Sh}{f}\right) \cong \frac{Sh}{f} \quad (5)$$

At this time, the lens shift amount when the optical image stabilization mechanism is at a neutral position is defined as 0. In equations (5), if the focal length is handled by pixel of an image, the correction angle can be handled as a translation amount on an image.

Letting Shy be the lens shift amount in the Yaw direction with respect to the optical axis of the camera, and Shp be the lens shift amount in the Pitch direction, movement of the display region caused by optical image stabilization can be canceled in the form of:

$$x_{rev} = x - Shy_{-1}$$

$$y_{rev} = y - Shp_{-1}$$

$$x'_{rev} = x' - Shy$$

$$y'_{rev} = y' - Shp \quad (6)$$

where Shy and Shp are the image stabilization shift amounts in a current frame, Shy and Shp are the image stabilization shift amounts in an immediately preceding frame, x and y are the x- and y-coordinates in the immediately preceding frame, $x_{rev}$ and $y_{rev}$ are the x- and y-coordinates after canceling movement of the display region caused by optical image stabilization, x' and y' are the x- and y-coordinates in the current frame, and $x'_{rev}$ and $y'_{rev}$ are the x- and y-coordinates after canceling movement of the display region caused by optical image stabilization.

Also, in step S12, a corresponding point may be transformed from a corresponding point value in the pixel coordinate system of an input frame into a corresponding point value in the normalized image coordinate system, in order to improve the calculation accuracy and robustness in step S13. In the following description, (x, y) is a pixel coordinate point on an input frame, ($u_d$, $v_d$) is a normalized image coordinate point including a distortion, and (u, v) is a normalized image coordinate point after removing a distortion. Transformation is performed using internal parameters and a distortion coefficient. First, a corresponding point is transformed into a normalized image coordinate point based on the internal parameters:

$$\begin{bmatrix} u_d \\ v_d \\ 1 \end{bmatrix} = inv\left(\begin{bmatrix} f_{c\_new}k_u & 0 & u_0 \\ 0 & f_{c\_new}k_v & v_0 \\ 0 & 0 & 1 \end{bmatrix}\right)\begin{bmatrix} x \\ y \\ 1 \end{bmatrix} \quad (7)$$

where inv( ) is the inverse matrix of the parenthesized matrix. The matrix of the internal parameters is called a camera matrix K:

$$K = \begin{bmatrix} f_{c\_new}k_u & 0 & u_0 \\ 0 & f_{c\_new}k_v & v_0 \\ 0 & 0 & 1 \end{bmatrix} \quad (8)$$

The distortion is removed using the distortion coefficient:

$$\begin{bmatrix} u_d \\ v_d \end{bmatrix} \rightarrow \begin{bmatrix} u \\ v \end{bmatrix} \quad (9)$$

In expression (9), calculation "→" is implemented by processing to be described below. The distortion is removed using a radiation distortion relationship:

$$K = 1 + k_1 r + k_2 r^2 + k_3 r^3 + \ldots, r^2 = u_d^2 + v_d^2 \quad (10)$$

$$u = u_d/K, \quad v = v_d/K \quad (11)$$

where $k_1$, $k_2$, and $k_3$ are the first-, second-, and third-order distortion coefficients in the radius direction. These distortions are generated by aberration of the optical system. The distortion changes depending on camera parameters such as the focal length of the optical system and the object distance. Hence, the relationship with the focal length or the like is calculated from design values. This relationship is stored in a ROM (not shown) or the like as a lookup table corresponding to the focal length or the like, or a transformation regarding the focal length or the like.

In the first embodiment, only a distortion in the radius direction is removed. However, if another distortion such as a distortion in the radial direction is prominent, distortion removal processing may be separately added and performed.

Figure 3:
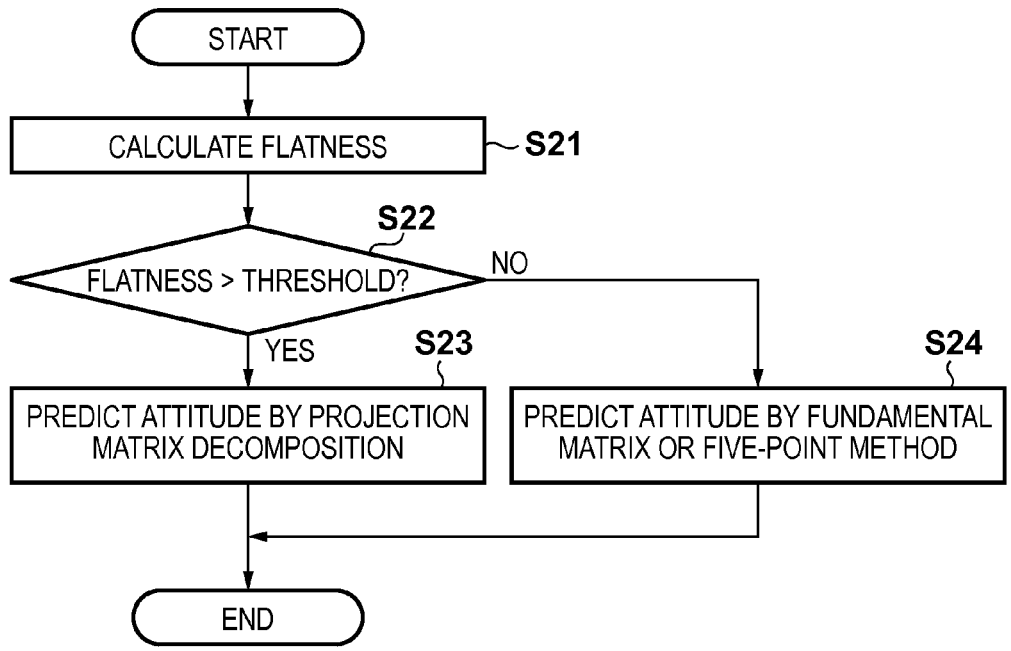
FIG. 3 is a flowchart for explaining details of attitude prediction processing according to the present invention.

In step S13, corrected corresponding points between the current frame and the past frame are input to predict an attitude change of the camera between the frames. FIG. 3 is a flowchart showing this prediction processing. In step S21, the flatness is calculated. The flatness is decided based on the condition number of a data matrix calculated from corresponding points. In this case, prediction processing corresponding to the flatness is performed for corresponding point information, from which the influence of optical image stabilization is eliminated in step S12, transformed into a value in the normalized image coordinate system. If the flatness is equal to or smaller than a predetermined threshold (NO in step S22), attitude prediction based on a fundamental matrix, or an attitude prediction method based on a pinhole camera model such as a five-point method is basically executed to predict a camera work (step S24). However, in corresponding point calculation, if a spatial arrangement in which the calculated position is mapped is a singular arrangement as on the plane (if the flatness exceeds the threshold, YES in step S22), no solution can be obtained by the fundamental matrix or five-point method owing to degeneracy. In this case, the attitude prediction method is switched to a method of obtaining a projection homography and predicting the camera attitude by a projection matrix decomposition operation (step S23).

Attitude prediction based on the projection homography, which is performed in step S23, will be explained below. Letting ($u_i$, $v_i$) be the normalized image coordinate point in a past frame, ($u_i'$, $v_i'$) be the normalized image coordinate point in a current frame, and i=1, . . . , m (m is the number of corresponding points), a linearization equation can be obtained for the projection homography:

$$\begin{bmatrix} 0 & 0 & 0 & -u_i & -v_i & -1 & v_i'u_i & v_i'v_i & v_i' \\ u_i & v_i & 1 & 0 & 0 & 0 & -u_i'u_i & -u_i'v_i & -u_i' \\ \vdots & \vdots & \vdots & \vdots & \vdots & \vdots & \vdots & \vdots & \vdots \\ 0 & 0 & 0 & -u_m & -v_m & -1 & v_m'u_m & v_m'v_m & v_m' \\ u_m & v_m & 1 & 0 & 0 & 0 & -u_m'u_m & -u_m'v_m & -u_m' \end{bmatrix}\begin{bmatrix} h_{11} \\ h_{12} \\ h_{13} \\ h_{21} \\ h_{22} \\ h_{23} \\ h_{31} \\ h_{32} \\ h_{33} \end{bmatrix} = 0 \quad (12)$$

If the number m of corresponding points≥8, the linearization equation results in overdetermination. By solving this linearization equation as a linear least-squares method, h={$h_{11}$, . . . , $h_{33}$} is obtained. This is rewritten into a 3×3 matrix:

$$H = \begin{bmatrix} h_{11} & h_{12} & h_{13} \\ h_{21} & h_{22} & h_{23} \\ h_{31} & h_{32} & h_{33} \end{bmatrix} \quad (13)$$

As a result, the projection homography, that is, the image change amount between frames is obtained.

Then, the projection homography is decomposed into a camera work rotation R, a direction n of a plane which approximates an object in a scene, and a product t/d of a translation t and depth d. Note that "→" suffixed to n and t indicates that n and t are vector values. In the following description, "→" represents a vector. By the following procedures, two possible solutions are calculated. Decomposition of the projection homography into two solutions is performed by detecting an invariant using eigenvalue decomposition and singular value decomposition. Various solution methods are possible. Here, an approach used in B. Triggs, "Autocalibration from Planar Scenes", ECCV98 will be described as a reference.

The relationship between the projection homography, the camera work, and the scene layout is given by:

$$H = \lambda \left( R + \frac{1}{d} \vec{n} \vec{t}^T \right) \quad (14)$$

where R and t are the camera rotation and translation, d is the distance to the reference plane, n is the normal in a direction in which the reference plane is moved apart from the camera, and $\lambda$ is an arbitrary constant. In calculation between two images, the product of the distance d of the spatial plane and the norm norm(t) of the camera work translation cannot be decomposed. The norm is a quantity representing the magnitude of a vector. That is, t is handled as a unit direction vector norm(t)=1 representing the translation direction, and d is handled as the product of the distance to the spatial plane and the translation amount.

First, assume that the sign of H is selected to satisfy $(x_2)^T H x_1 > 0$ for all corresponding points $x_1$ and $x_2$ on the plane.

Singular value decomposition of H is $H = USV^T$, where U and V are 3×3 rotation matrices, and $S = \text{diag}(\sigma_1, \sigma_2, \sigma_3)$ is a positive descending diagonal element: $\sigma_1 \geq \sigma_2 \geq \sigma_3 \geq 0$ and is the singular value of H. $u_1, u_2, u_3, v_1, v_2,$ and $v_3$ represent the column elements of the associated orthogonal matrices U and V.

The reference system of the first camera is employed, and the three dimensional plane is represented by $(n)^T x = d = 1/\zeta$, where n is an outward (direction in which the plane is moved apart from the camera) normal. $\zeta = 1/d \geq 0$ is the reciprocal of the distance to the plane. In this reference system, the first camera has a 3×4 projection matrix $P_1 = [I_{3 \times 3} | 0]$. The second camera has $P_2 = R[I_{3 \times 3} | t] = [R | t']$, $t' = -Rt$, where t and t' are the translations between cameras (that is, the translations from the center of the optical axis of the first camera to the center of the optical axis of the second camera), and R is the rotation between the cameras.

A homography from image 1 to image 2 is $H = rH_1$, where $H_1 = I_{3 \times 3} - \zeta t n^T$. (For a three dimensional point x on the plane, $Hx = R(x - \zeta t(n)^T x) = R(x-t) \approx P_2 x$ because $\zeta(n)^T x = 1$. When x is handled as an arbitrary point in image 1, the difference is only the overall scale factor.)

Only the product $\zeta t(n)^T$ is restorable and thus is normalized by $\|t\| = \|n\| = 1$. That is, the plane distance $1/\zeta$ is measured at a unit base-line length $\|t\|$. To decide a possible sign, a positive depth constraint test to be described later is performed.

In singular value decomposition, $H = USV^T$ and $H_1 = U_1 SV^T$ are the same up to the R element. That is, $U = RU_1$. In $H_1$, an outer product vector t×n is constant. If the singular value is definite, t×n needs to correspond to a singular vector. This reveals that t×n is always the second singular vector $v_2$. Therefore, correction normalization of H is $H \rightarrow H/\sigma_2$, that is, $(\sigma_1, \sigma_2, \sigma_3) \rightarrow (\sigma_1/\sigma_2, 1, \sigma_3/\sigma_2)$. Assume that normalization based on $\sigma_2$ has been done.

When t×n corresponds to $v_2$ in image frame 1, a {t, n} partial space needs to be occupied by $\{v_1, v_3\}$, that is, $n = \beta v_1 - \alpha v_3$ and $n \times (t \times n) \approx \alpha v_1 + \beta v_3$ with respect to arbitrary parameters $\alpha$ and $\beta$ ($\alpha^2 + \beta^2 = 1$). The {t, n} partial space has a norm which does not change regardless of an arbitrary direction (particularly, n×(t×n) is H or $H_1$) perpendicular to n.

In this case, $(\alpha \sigma_1)^2 + (\beta \sigma_3)^2 = \alpha^2 + \beta^2$, or $(\alpha, \beta) = (\pm\sqrt{1 - \sigma_3^2}), (\pm\sqrt{\sigma_1^2 - 1}))$. If t×n is made to correspond to $v_1$ or $v_3$ described above, no solution is obtained. For this reason, only $v_2$ is possible.

Strictly speaking, the same augment on the left-hand side indicates $Rt = -(\beta u_1 + \alpha u_3)$. If t satisfies the eigenvector of the eigenvalue of $H_1$: $1 - \zeta n(t)^T$, $Ht = (1 - \zeta(n)^T t)Rt$ is obtained. Thus, $t \approx H^{-1}(Rt) \approx \beta/\sigma_1 v_1 + \alpha/\sigma_3 v_3$. (After simplification,) $\zeta = \sigma_1 - \sigma_3$.

The left-hand side (column of $U_1$: $u_1, u_2,$ and $u_3$) of singular value decomposition of $H_1$ is restorable by the notation: $u_2 = v_2$, and t needs to be the eigenvector of $H_1$. At this time, $u_1 = \gamma v_1 + \delta v_3$, and $u_3 = \delta v_1 - \gamma v_3$. After simplification, $(\gamma, \delta) \approx (1 + \sigma_1 \sigma_3, \pm \alpha \beta)$. Finally, the rotation R is obtained by:

$$R = UU_1^T = U \begin{vmatrix} \gamma & 0 & \delta \\ 0 & 1 & 0 \\ -\delta & 0 & \gamma \end{vmatrix} V^T \quad (15)$$

A series of detailed processes to calculate, as the image change amount, two possible solutions each of the camera work R defined by the rotation and translation, and the scene layout defined by direction vector t, the depth position d of the reference plane in the space, and the direction n will be summarized below.

$$[U, S, B] = svd(H) \quad (16)$$

$$\sigma_1' = \sigma_1/\sigma_2, \sigma_3' = \sigma_3/\sigma^2 \quad (17)$$

where $$S = \begin{bmatrix} \sigma_1 & 0 & 0 \\ 0 & \sigma_2 & 0 \\ 0 & 0 & \sigma_3 \end{bmatrix}, \sigma_1 \geq \sigma_2 \geq \sigma_3 \geq 0 \quad (18)$$

$$\zeta = (1/d) = \sigma_1' - \sigma_3' \quad (19)$$

$$a_1 = \sqrt{1 - \sigma_3'^2}, b_1 = \sqrt{\sigma_1'^2 - 1} \quad (20)$$

$$a = \frac{a_1}{\sqrt{a_1^2 + b_1^2}}, b = \frac{b_1}{\sqrt{a_1^2 + b_1^2}} \quad (21)$$

$$c = \frac{1 + \sigma_1' \sigma_3'}{\sqrt{(1 + \sigma_1' \sigma_3')^2 + (a_1 b_1)^2}}, \quad (22)$$

$$d = \frac{a_1 b_1}{\sqrt{(1 + \sigma_1' \sigma_3')^2 + (a_1 b_1)^2}}$$

$$e = \frac{-b/\sigma_1'}{\sqrt{(-b/\sigma_1')^2 + (-a/\sigma_3')^2}}, \quad (23)$$

$$f = \frac{-a/\sigma_3'}{\sqrt{(-b/\sigma_1')^2 + (-a/\sigma_3')^2}}$$

-continued $$\vec{v}_1 = V(:,1), \vec{v}_3 = V(:,3) \quad (24)$$
$$\vec{u}_1 = U(:,1), \vec{u}_3 = U(:,3)$$

By using these equations, two possible solutions $\{R_1, t_1, n_1\}$ and $\{R_2, t_2, n_2\}$ are obtained:

$$\vec{n}_1 = b\vec{v}_1 - a\vec{v}_3, \vec{n}_2 = b\vec{v}_1 + a\vec{v}_3 \quad (25)$$

$$R_1 = U \begin{vmatrix} c & 0 & d \\ 0 & 1 & 0 \\ -d & 0 & c \end{vmatrix} V^T, R_2 = U \begin{vmatrix} c & 0 & -d \\ 0 & 1 & 0 \\ d & 0 & c \end{vmatrix} V^T \quad (26)$$

$$\vec{t}_1 = -(b\vec{u}_1 + a\vec{u}_3), \vec{t}_2 = -(b\vec{u}_1 - a\vec{u}_3) \quad (27)$$

(where $P_2 = [R | t]$)

For a pair of these solutions, a promise (positive depth constraint) that the azimuth vector n is outward is introduced. By making the signs match:

$$\text{if } (\vec{n}_1(3)<0) \vec{t}_1 = -\vec{t}_1, \vec{n}_1 = -\vec{n}_1 \quad (28)$$

$$\text{if } (\vec{n}_2(3)<0) \vec{t}_2 = -\vec{t}_2, \vec{n}_2 = -\vec{n}_2 \quad (29)$$

two possible solutions are calculated. After that, an epipolar error check is performed to extract one solution having a smaller error.

The epipolar error check is executed as follows. For two possible solution sets $\{R_1, t_1/d, n_1\}$ and $\{R_2, t_2/d, n_2\}$ each of an attitude change and scene information obtained by decomposing a homography obtained by the corresponding points $x_1$ and $x_2$, epipolar errors are calculated using the corresponding points. The epipolar error is given by:

$$e_i = \sum_j^n \left( \vec{x}_2^{jT} ([\vec{t}_i]_x R_i) \vec{x}_1^j \right), i = 1, 2, j = 1, 2, \ldots, n \quad (30)$$

where n is the number of corresponding points. A solution having a smaller error is selected as a true solution. As a result, a single solution $\{R_1, t_1, n_1, d\}$ representing a camera work between input frames is attained.

Note that attitude prediction based on a fundamental matrix (see, for example, R. Hartley, A. Zisserman, "Multiple View Geometry in Computer Vision", Cambridge Univ. Press (2000)), and the five-point method (see, for example, Bill Triggs, "Routines for Relative Pose of Two Calibrated Cameras from 5 Points", Documentation, INRIA. juillet 2000), which are camera attitude prediction methods for a nonplanar scene on the premise of a pinhole camera model, and a description of which is omitted in the first embodiment, can be implemented based on known techniques.

The obtained camera work information between frames is input to the image processing unit 19 in synchronism with the frames used to calculate camera work information. As optional image processes, the image processing unit 19 performs CG creation, sprite synthesis with a shot video, geometric transformation processing, three dimensional image analysis, and the like by using the camera work information. In this manner, applications such as the AR synthesis function, image stabilization function, and three dimensional information acquisition function, which enhance the user value, are implemented.

AR synthesis will be exemplified. AR synthesis is a technique of synthesizing a shot video and CG created in consideration of a camera work. CG synthesis starts using a given frame as a reference. A camera work generated in a camera which actually shoots a video is reflected from this frame, and CG corresponding to each frame is created. When the position of an actually shooting camera serving the initial frame and the position of a rendering camera for corresponding CG are used as a reference, the camera matrix is given by:

$$P_0 = K[I | \vec{0}] \quad (31)$$

Figure 5A:
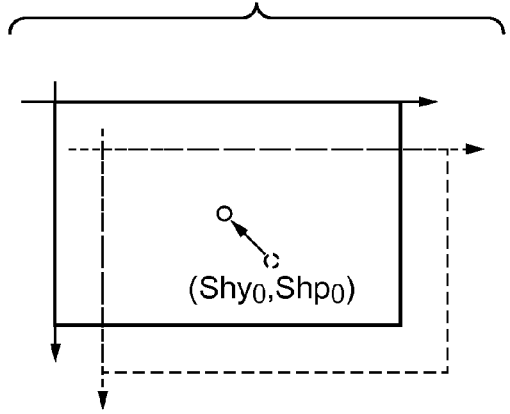
FIGS. 5A and 5B are views for explaining the use of optical image stabilization control information in AR synthesis.
Figure 5A:
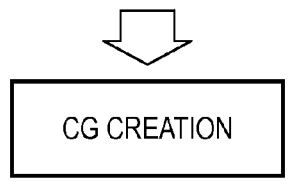

At this time, the optical image stabilization effect can be given by adding, to CG, an operation reverse to the offset removal work executed for the coordinates of the corresponding point in step S12. More specifically, the influence of optical image stabilization can be taken into consideration by adding an offset (Shy$_0$, Shp$_0$) to a rendering view in CG creation and rendering CG, as shown in FIG. 5A. In other words, view translation caused by optical image stabilization can be reflected in CG to be created. To achieve this, information from the optical image stabilization control monitoring unit 15 is input to the image processing unit 19, similar to the camera work prediction unit 18, and CG rendering is performed. The created CG is sprite-synthesized with a shot image, implementing AR.

Figure 5B:
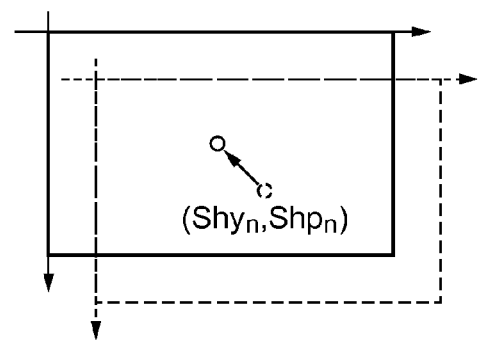
Figure 5B:
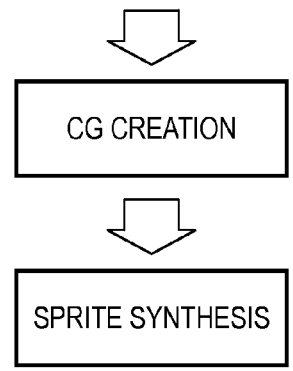

When rendering CG after n frames, the camera matrix is decided as follows in consideration of a change of the camera work between these frames, and CG is rendered as shown in FIG. 5B:

$$P_n = K([R_n | \vec{t}_n] \ldots [R_1 | \vec{t}_1][I | \vec{0}]) \quad (32)$$

This matrix indicates the camera matrix of an image shot after n frames using the initial frame as a reference. In the parentheses, an attitude change of the current frame from a reference frame is obtained by multiplying and coupling the attitude matrices [R$_i$|t$_i$]:

$$M_{sum} = M_n \ldots M_1 M_0 = [R_n | \vec{t}_n] \ldots [R_1 | \vec{t}_1][I | \vec{0}] \quad (33)$$

t in step S13 is a unit matrix, and all the norms are contained in d from the start point of the reference plane of the scene. To the contrary, t$_1$ at this time has norms distributed with depth information 1/d. The distribution is decided based on information contained in a moving image, such as the size of a face region captured in the scene, and the average camera moving amount, for example, the translation amount of first several frames. The latter method is a general tacit knowledge which has conventionally been used even in AR synthesis in G. Klein, D. Murray, "Parallel Tracking and Mapping on a Camera Phone", In Proc. ISMAR '09. ratio is a scale factor which is decided based on information in a moving image and basically has a range of 0 to 1:

$$\vec{t}' = \text{ratio} \times \frac{1}{d} \times \vec{t} \quad (34)$$

The use of camera work information in CG creation will be explained according to a general-purpose CG definition. In a normal CG creation architecture, a camera work can be reflected in CG rendering by inputting pieces of camera attitude information R$_C$ and t$_C$ with respect to world coordinates in the CG space. R with respect to the world coordinate system is the rotation of the camera, and t is the translation of the camera. Letting R$_C$ and t$_C$ be pieces of initial camera attitude information set on the CG side for the initial frame in AR synthesis, the attitude matrix $[R_C|t_C]$ is multiplied from left by an attitude matrix calculated by the camera work prediction unit 18 for each frame, obtaining camera attitude information $R'_C$, $t'_C$, or $M'_C$ of a current frame:

$$M'_c = [R'_c | \vec{t}'_c] = M_n \ldots M_1 M_0 M_c = [R_n | \vec{t}_n] \ldots [R_1 | \vec{t}_1][I | \vec{0}][R_c | \vec{t}_c] \quad (35)$$

Camera attitude information in equation (35) corresponding to each video frame is set to create CG. Therefore, CG which moves in accordance with the camera work can be created.

At this time, for the rendering view of CG creation, similar to the initial frame, CG is rendered while offsetting the rendering view by $(Shy_n, Shp_n)$ in consideration of the translation of a view caused by optical image stabilization of the current frame. Thus, CG reflecting the optical image stabilization can be created.

If the camera matrix in CG creation is decided by only integration of camera prediction between frames, a drift is generated from an integration error. To remove the drift, a high-accuracy camera work between distant frames may be obtained by executing bundle adjustment in another circuit (not shown) for camera work information in a frame section of an arbitrary predetermined period in parallel with processing by the camera work prediction unit. At this time, input of corresponding point information obtained in step S12 from which the influence of optical image stabilization has been removed, and camera work information obtained in step S13 is used as input information in bundle adjustment processing. Drift-free AR synthesis may be implemented by substituting the high-accuracy camera work calculated by this processing, for an attitude change matrix in which integration proceeds during online processing.

CG creation and AR synthesis may be executed by dedicated PC software called post-production software or composite (synthesis) software, or an equivalent dedicated hardware device, that is, a so-called external device (for example, NUKE available from THE FUNDARY). In this case, optical image stabilization control information measured by the optical image stabilization control monitoring unit 15, camera work information generated by the camera work prediction unit 18, and a video created by the image processing unit 19 are output from the output interface (not shown) of the image capturing apparatus. These pieces of information are input to the external device to perform CG creation and sprite synthesis, thereby generating an AR synthesized video.

Most CG software programs reflect a so-called tilt shift lens in a CG camera model, and thus have a view translation setting function in the attribute settings of a CG camera. A set of pieces of information is measured, predicted, and output together with a created video. Accordingly, even a general-purpose external device can implement natural AR synthesis for a blur-free video captured using optical image stabilization. Needless to say, the set of pieces of information are camera work information from which the influence of optical image stabilization has been removed, and the optical image stabilization control information.

Figure 6:
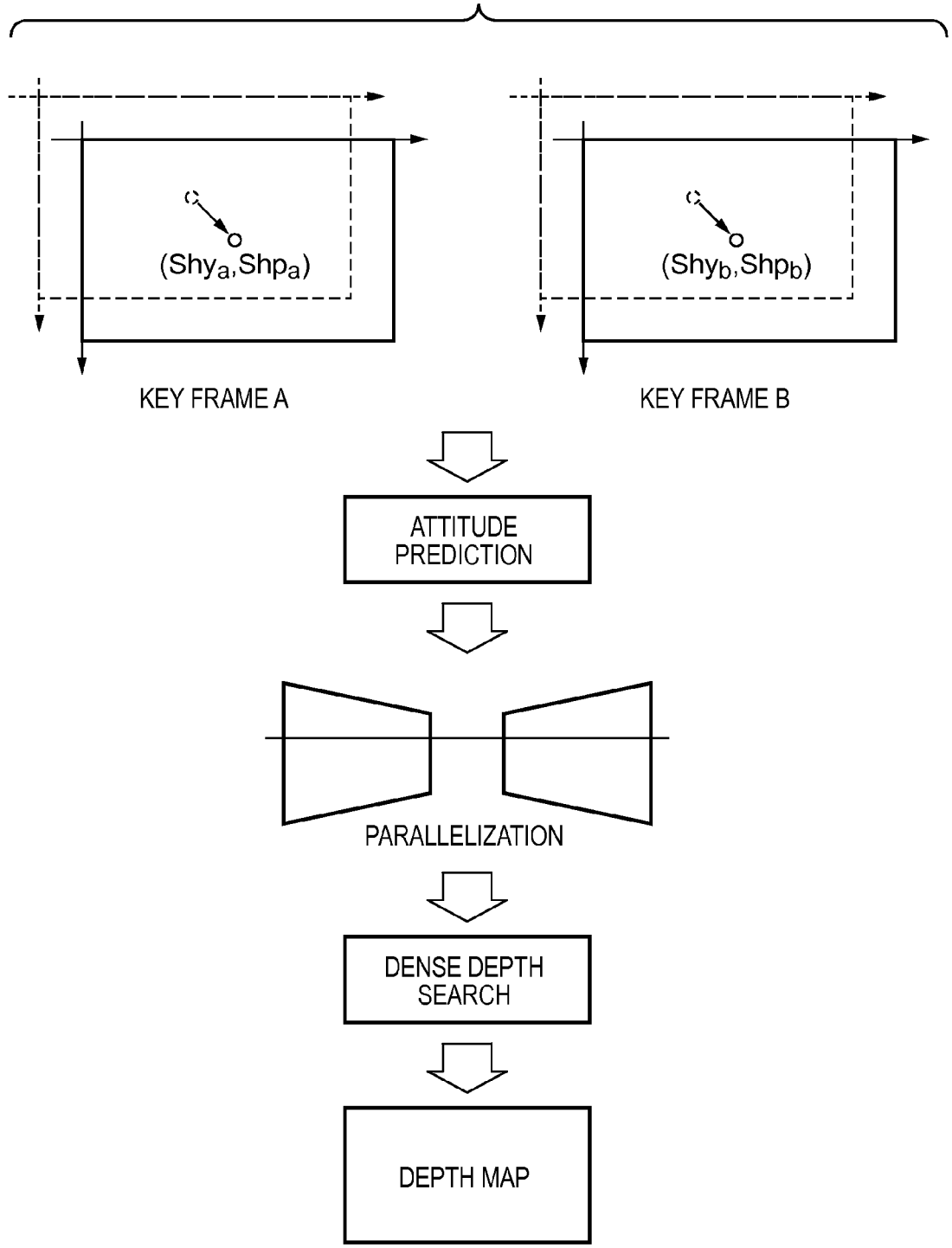
FIG. 6 is a view for explaining the use of optical image stabilization control information and a camera work in three dimensional image analysis.

For three dimensional image analysis, three dimensional information is obtained by selecting key frames (two frames) spaced apart by an arbitrary predetermined frame period or more by which the base line can be ensured. First, parallelization and rectification are executed based on an attitude change calculated from a camera work between the key frames, in consideration of the translation of a view caused by optical image stabilization. Then, dense corresponding point search such as the gradient method is performed on the parallelized key frame image. Trigonometric parallax is performed for the obtained dense corresponding points, obtaining three dimensional information as the depth. The obtained depth information is shifted in accordance with the shift amount of optical image stabilization control information of an image frame to be associated, thereby obtaining three dimensional information in which the pixel tone and depth information of the image are registered. FIG. 6 shows an outline of the use of optical image stabilization control information and a camera work in three dimensional image analysis. $(Shy_a, Shp_a)$ is optical image stabilization control information corresponding to key frame A, and $(Shy_b, Shp_b)$ is optical image stabilization control information corresponding to key frame B. The key frames are selected from arbitrary frames capable of ensuring a predetermined base line or more. The arbitrary number of key frames is two or more. The influence of optical image stabilization is eliminated from an image in accordance with each optical image stabilization control information, and parallelization is performed. According to the embodiment, three dimensional image analysis can be executed for a blur-free video captured using optical image stabilization, without any geometric conflict. It is therefore expected to improve the depth calculation ability of a three dimensional information extractor as in the gradient method or the like, and improve the accuracy of three dimensional information itself to be output. Rectification itself is a basic technique in this technical field described in, for example, R. Szeliski, "Compute Vision Algorithms and Applications", (2010).

As described above, according to the first embodiment, a camera work is calculated by taking account of optical image stabilization control information, and is used for image processing. By virtue of this, applications such as AR synthesis and three dimensional information acquisition can be executed at higher quality than in a conventional technique.

For example, a blur-free AR image can be easily synthesized by a video camera having the optical image stabilization function, without using a special shooting jig such as a steady cam.

Further, calculation can be simplified, compared to a case in which a complicated camera model which considers even optical image stabilization and has many variables is prepared, and a camera work is predicted from only image information by using an optimization technique such as model fitting. This can implement highly stable processing capable of easily reducing the calculation amount of optimization calculation and achieving real-time processing even by a small-scale circuit.

Second Embodiment

Figure 7:
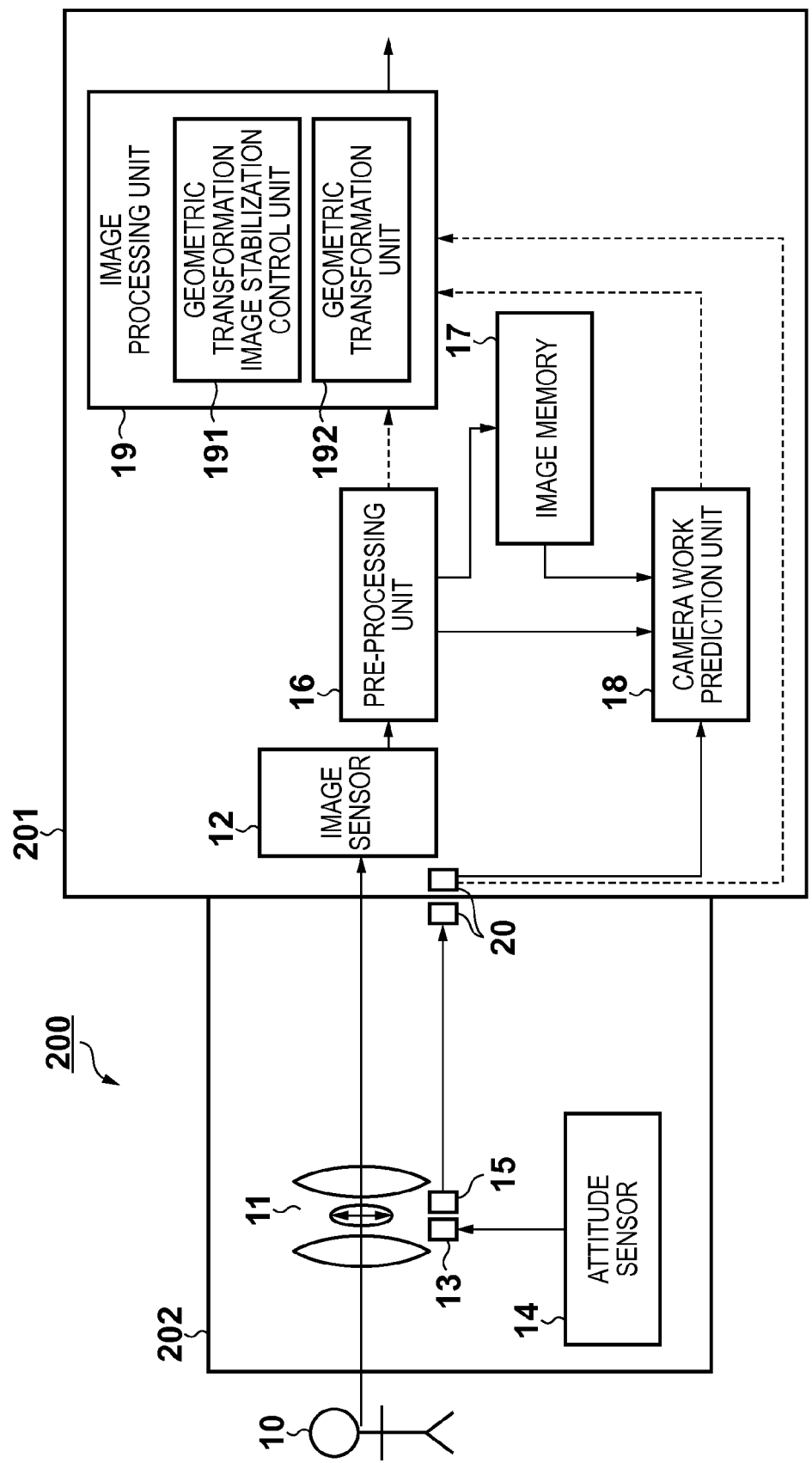
FIG. 7 is a block diagram showing the schematic arrangement of an image capturing apparatus in the second embodiment of the present invention.

Next, the second embodiment according to the present invention will be explained. FIG. 7 is a block diagram for explaining the arrangement of the main part of an image capturing apparatus according to the second embodiment. An image capturing apparatus 200 in the second embodiment includes two parts: a camera body 201 and lens barrel 202. The lens barrel 202 includes an attitude sensor 14 and optical image stabilization control monitoring unit 15, in addition to an optical system 11 including the optical image stabilization mechanism having the same arrangement as that described with reference to FIG. 1, and an optical image stabilization control unit 13. The lens barrel 202 transfers optical image stabilization control information between the camera body 201 and the lens barrel 202 via a communication unit 20. That is, assume that information of the attitude sensor 14 is not obtained on the side of the camera body 201. For example, assume that the communication band bit rate of the communication unit 20 is very low, like the interchangeable lens specification of an old-style single-lens reflex camera.

Note that camera work prediction processing in the image capturing apparatus 200 according to the second embodiment is the same as that in the above-described first embodiment, and a description thereof will not be repeated. As optical image stabilization control information used in camera work prediction processing, information generated in the lens barrel 202 is output from the lens barrel 202 to the camera body 201 via the communication unit 20, and is input to a camera work prediction unit 18.

An image processing unit 19 according to the second embodiment incorporates a geometric transformation image stabilization control unit 191 and geometric transformation unit 192. The geometric transformation image stabilization control unit 191 processes, in time series, camera work information obtained as an output from the camera work prediction unit 18, generating geometric transformation image stabilization control information. For example, the geometric transformation image stabilization control unit 191 calculates a camera work smoothed by time series processing, and transfers a difference from an original camera work as geometric transformation image stabilization control information to the geometric transformation unit 192. The geometric transformation unit 192 has a function of receiving geometric transformation image stabilization control information and geometrically transforming an image frame. The geometric transformation unit 192 obtains a stabilized video by geometric transformation. When the degree of freedom of geometric transformation implemented by the geometric transformation unit 192 is the degree of freedom of projection, geometric transformation image stabilization control information is information expressible by a homography. As offline processing, for example, the property in which a camera work can be decomposed into a low-order base by eigenvalue decomposition is exploited, as described in Michal Irani, et al., "Multi-frame correspondence estimation using subspace constraints.", International Journal of Computer Vision 48, 1, pp. 39-51 (2002). By filtering a component value corresponding to each obtained eigen base, geometric transformation image stabilization control information can be obtained.

More specifically, geometric transformation image stabilization control information corresponding to each eigen base is obtained by high-pass-filtering a component value corresponding to each eigen base obtained by base transformation using eigenvalue decomposition. Then, inverse transformation of the base is executed to obtain geometric transformation image stabilization control information serving as an input to the geometric transformation unit 192. Alternatively, a smoothed stabilized camera work is calculated first by performing low-pass filtering, as described above. Then, a difference from an original camera work is calculated as geometric transformation image stabilization control information on the eigen base. Finally, geometric transformation image stabilization control information serving as an input to the geometric transformation unit is obtained by inverse transformation of eigenvalue decomposition.

However, the above-mentioned method can be executed in only offline processing after a certain amount of camera work information is accumulated. To execute this processing online, a camera work is handled as a homography, the homography is decomposed into change components of the image, and time series filtering is performed, as disclosed in C. Harris and M. Stephens, "A combined corner and edge detector", Fourth Alvey Vision Conference, pp. 147-151, 1988. Even in this case, the same effects as those described above can be obtained. Unlike the former method, the latter method performs filtering on the base of the image change amount whose influence more directly appears in a final image, and thus can easily attain a smoother stabilized video.

The geometric transformation unit 192 receives geometric transformation image stabilization control information for each frame of a video, and geometrically transforms a corresponding image frame, obtaining a stabilized video. At this time, the image undergoes the same operation as the offset removal work executed for the coordinates of a corresponding point in step S12 of FIG. 2, canceling the influence of optical image stabilization. More specifically, an offset ($Shy_0$, $Shp_0$) is subtracted, and geometric transformation complying with geometric transformation image stabilization control information is executed. Then, a series of geometric transformations is executed as follows for an input image frame to restore the optical image stabilization effect. That is, only a translation component to be corrected by the geometric transformation image stabilization control information is subtracted from the offset ($Shy_0$, $Shp_0$). The result is further added to the geometric transformation image stabilization control information.

Figure 8:
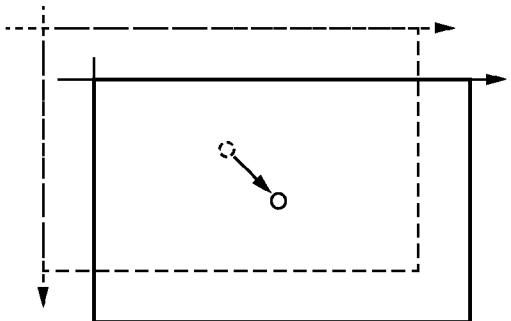
FIG. 8 is a view for explaining the use of optical image stabilization control information in image stabilization based on geometric transformation in the second embodiment.
Figure 8:
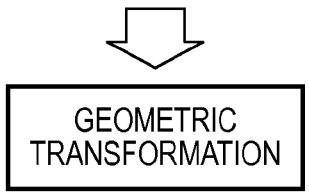
Figure 8:
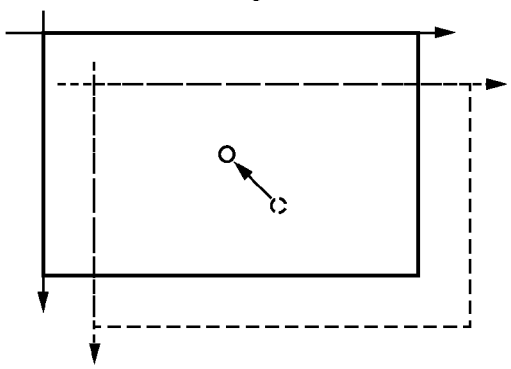

FIG. 8 shows the above-described series of geometric transformation procedures. The series of geometric transformations can be expressed as a homography and can be executed at once for an image. Optical image stabilization control information measured by the optical image stabilization control monitoring unit 15, and camera work information generated by the camera work prediction unit 18 are input to the image processing unit 19, and a video created by basic processing of the image processing unit 19 is geometrically transformed according to the aforementioned procedures. Image stabilization considering the influence of optical image stabilization can therefore be implemented.

As described above, according to the second embodiment, when a video input apparatus includes the optical image stabilization mechanism and information of the attitude sensor 14 cannot be obtained on the side of the camera body 201, a camera work can be robustly predicted from image information. As a result, applications such as AR synthesis, image stabilization, and three dimensional information acquisition, which enhance the value of the image capturing apparatus, can be implemented.

Other Embodiments

Note that the present invention may be applied to a system constructed by a plurality of devices (for example, an image capturing apparatus such as a camera, an interface device, and an image processing apparatus) or an apparatus (for example, a digital camera) constructed by one device.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-064916, filed on Mar. 26, 2013 which is hereby incorporated by reference herein in its entirety.

What is claimed is:

1. An image processing apparatus comprising a CPU that performs to:
acquire a first image signal and a second image signal of a frame later than a frame of the first image signal obtained by photoelectrically converting, by a image sensor, an optical image incident via an optical system including a plurality of lenses and an actuator that drives at least part of the plurality of lenses to realize optical image stabilization;
acquire information indicating a driving amount of the actuator; and
predict a motion of camera, having the image sensor, based on the first image signal, the second image signal, and the information indicating the driving amount of the actuator in a case where the actuator drives at least the part of the plurality of lenses when the second image signal is obtained,
wherein:
a plurality of corresponding points in a second image signal corresponding to a plurality of points of interest in the first image signal are extracted,
a position of each of the plurality of corresponding points based on the driving amount of the actuator is corrected, and
a motion of camera is predicted based on plurality of points of interest and the plurality of corresponding points each position of which is corrected.

2. The apparatus according to claim 1 wherein the CPU further performs to create computer graphics, reflect the predicted motion of camera in the created computer graphics, and synthesize the computer graphics with the image signal.

3. The apparatus according to claim 1 wherein the CPU further performs to parallelize, based on an attitude change calculated from the motion of camera, image signals of two frames spaced apart by a predetermined frame period, and acquire three dimensional information from the parallelized image signals.

4. The apparatus according to claim 1 wherein the further performs to:
obtain a motion of camera smoothed by performing time series processing for information of the motion of camera, and obtain a difference between the smoothed motion of camera and an original motion of camera; and
acquire a stabilized video by geometrically transforming the image signal based on the difference for each frame.

5. The apparatus according to claim 1, wherein the information indicating a driving amount of the actuator includes a shift amount of the optical image.

6. The apparatus according to claim 5, wherein the shift amount of the optical image is formed from a plurality of control physical amounts or a set of the plurality of control physical amounts, including shift amounts of a focal length and the part of the plurality of lenses driven by the actuator, from which a shift of the optical is cage on the image sensor can be calculated.

7. The apparatus according to claim 4, wherein the information of the motion of camera includes a rotation amount and translation amount of the camera.

8. The apparatus according to claim 1, further comprising an output interface configured to output the image signal, the information of the motion of camera, and the optical image stabilization control information.

9. An image capturing apparatus comprising:
an image sensor; and
an image processing apparatus comprising a CPU that performs to:
acquire a first image signal and a second image signal of a frame later than a frame of the first image signal obtained by photoelectrically converting, by an image sensor, an optical image incident via an optical system including a plurality of lenses and an actuator that drives at least part of the plurality of lenses to realize optical image stabilization;
acquire information indicating a driving amount of the actuator; and
predict a motion of camera, having the image sensor, based on the first image signal, the second image signal, and the information indicating the driving amount of the actuator in a case where the actuator drives at least the part of the plurality of lenses when the second image signal is obtained,
wherein:
a plurality of corresponding points in a second image signal corresponding to a plurality of points of interest in the first image signal are extracted,
a position of each of the plurality of corresponding points based on the driving amount of the actuator is corrected, and
a motion of camera is predicted based on plurality of points of interest and the plurality of corresponding points each position of which is corrected.

10. The apparatus according to claim 9, further comprising an optical system.

11. An image processing method to be performed in an image processing apparatus comprising:
acquire a first image signal and a second image signal of a frame later than a frame of the first image signal obtained by photoelectrically converting, by an image sensor, an optical image incident via an optical system including a plurality of lenses and an actuator that drives least part of the plurality of lenses to realize optical image stabilization;
acquiring information indicating a driving amount of the actuator; and
predicting a motion of camera, having the image sensor, based on the first image signal the second image signal, and the information indicating the driving amount of the actuator in a case where the actuator drives at least the part of the plurality of lenses when the second image signal is obtained, wherein:
a plurality of corresponding points in a second image signal corresponding to a plurality of points of interest in the first image signal are extracted,
a position of each of the plurality of corresponding points based on the driving amount of the actuator is corrected, and
a motion of camera is predicted based on plurality of points of interest and the plurality of corresponding points each position of which is corrected.

12. A non-transitory computer-readable storage medium having stored thereon a program which is executable by an image processing apparatus, the program having a program code for realizing the image processing method to be performed in an image processing apparatus comprising:
acquire a first image signal and a second image signal of a frame later than a frame of the first image signal obtained by photoelectrically converting, by an image sensor, an optical image incident via an optical system including a plurality of lenses and an actuator that drives at least part of the plurality of lenses to realize optical image stabilization;
acquiring information indicating a driving amount of the actuator; and
predicting a motion of camera, having the image sensor, based on the first image signal, the second image signal, and the information indicating the driving amount of the actuator in a case where the actuator drives at least the part of the plurality of lenses when the second image signal is obtained,
wherein:
a plurality of corresponding points in a second image signal corresponding to a plurality of points of interest in the first image signal are extracted,
a position of each of the plurality of corresponding points based on the driving amount of the actuator is corrected, and
a motion of camera is predicted based on plurality of points of interest and the plurality of corresponding points each position of which is corrected.

* * * * *